(12) United States Patent
Diao et al.

(10) Patent No.: US 12,495,457 B2
(45) Date of Patent: Dec. 9, 2025

(54) SIGNALING FOR MULTICAST BROADCAST SERVICES

(71) Applicant: ZTE Corporation, Guangdong (CN)

(72) Inventors: Xueying Diao, Shenzhen (CN); Lin Chen, Shenzhen (CN); Tao Qi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 390 days.

(21) Appl. No.: 18/164,797

(22) Filed: Feb. 6, 2023

(65) Prior Publication Data
US 2023/0189364 A1   Jun. 15, 2023

Related U.S. Application Data

(63) Continuation of application No. PCT/CN2020/107375, filed on Aug. 6, 2020.

(51) Int. Cl.
*H04W 76/15* (2018.01)
*H04W 28/02* (2009.01)
*H04W 76/12* (2018.01)

(52) U.S. Cl.
CPC ....... *H04W 76/15* (2018.02); *H04W 28/0268* (2013.01); *H04W 76/12* (2018.02)

(58) Field of Classification Search
CPC . H04W 76/15; H04W 28/0268; H04W 76/12; H04W 4/06; H04W 76/40; H04W 28/04; H04W 76/11; H04W 92/16; H04L 67/146; Y02D 30/70
See application file for complete search history.

(56) References Cited

U.S. PATENT DOCUMENTS

| 2008/0181161 | A1* | 7/2008 | Gi Kim | H04W 72/30 |
| | | | | 370/312 |
| 2019/0158985 | A1 | 5/2019 | Dao et al. | |
| 2020/0178326 | A1* | 6/2020 | Sirotkin | H04W 76/12 |
| 2021/0022063 | A1* | 1/2021 | Yang | H04W 40/02 |
| 2021/0160954 | A1* | 5/2021 | More | H04W 4/06 |
| 2022/0182186 | A1* | 6/2022 | Park | H04W 80/02 |

(Continued)

FOREIGN PATENT DOCUMENTS

| CN | 101141688 A | 3/2008 |
| CN | 101163331 A | 4/2008 |

(Continued)

OTHER PUBLICATIONS

Tencent, "Annex #A: MBS Control Plane and User Plane Stack," SA WG2 Meeting #139E, S2-2003989, Elbonia, Jun. 1, 2020-Jun. 12, 2020 (3 pages).

(Continued)

*Primary Examiner* — Sudesh M. Patidar
(74) *Attorney, Agent, or Firm* — Perkins Coie LLP

(57) ABSTRACT

Methods, systems and apparatus for implementing multicast broadcast services in a wireless network are described. One example method includes communicating a message on an interface between a control plane (CP) function of a network node and a user plane (UP) function of the network node that provides data connectivity to one or more wireless devices in a wireless network, and configuring, based on the message, the network node to provide a service carrying a multicast or broadcast data for a session for the one or more wireless devices.

17 Claims, 5 Drawing Sheets

400 communicating a message on an interface between a control plane (CP) function of a network node and a user plane (UP) function of the network node that provides data connectivity to one or more wireless devices in a wireless network ～ 402 configuring, based on the message, the network node to provide a service carrying a multicast or broadcast data for a session for the one or more wireless devices ～ 404

(56) References Cited

U.S. PATENT DOCUMENTS

| | | | | |
|---|---|---|---|---|
| 2022/0210647 A1* | 6/2022 | Centonza | ............ | H04L 12/4633 |
| 2023/0025793 A1* | 1/2023 | Xiong | ............... | H04W 36/0007 |
| 2023/0072861 A1* | 3/2023 | Byun | ........................ | H04L 1/08 |

FOREIGN PATENT DOCUMENTS

| | | | | |
|---|---|---|---|---|
| CN | 101299828 | A | | 11/2008 |
| CN | 110463275 | A | | 11/2019 |
| WO | 2017/128704 | A1 | | 8/2017 |
| WO | 2019096988 | A1 | | 5/2019 |
| WO | 2019139530 | A1 | | 7/2019 |
| WO | 2019192104 | A1 | | 10/2019 |
| WO | 2019194486 | A1 | | 10/2019 |
| WO | 2020002374 | A1 | | 1/2020 |
| WO | WO-2022017437 | A1 * | 1/2022 | ............ H04W 24/10 |

OTHER PUBLICATIONS

International Search Report and Written Opinion for International Application No. PCT/CN2020/107375, mailed on Apr. 29, 2021 (9 pages).
First Examination Report for Indian Patent Application No. 202317005955, mailed Aug. 12, 2024 (6 pages).
Extended European Search Report for European Patent Application No. 20948865.9, mailed Feb. 12, 2024 (11 pages).
CNIPA, First Office Action for Chinese Application No. 202080104382.6, mailed on May 28, 2025, 20 pages with unofficial English translation.

* cited by examiner

SIGNALING FOR MULTICAST BROADCAST SERVICES

CROSS REFERENCE TO RELATED APPLICATIONS

This patent document is a continuation of and claims benefit of priority to International Patent Application No. PCT/CN2020/107375, filed on Aug. 6, 2020. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques will provide support for more features and flexible network operations.

SUMMARY

This document relates to methods, systems, and devices providing multicast and broadcast services (MBS) in mobile communication technology, including 5th Generation (5G) and New Radio (NR) communication systems.

In one exemplary aspect, a method for wireless communication is disclosed. The method includes communicating a message on an interface between a control plane (CP) function of a network node and a user plane (UP) function of the network node that provides data connectivity to one or more wireless devices in a wireless network, and configuring, based on the message, the network node to provide a service carrying a multicast or broadcast data for a session for the one or more wireless devices.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

With the continuous development of 5G (5th generation mobile networks, the fifth generation of mobile communication technology), 5G solutions for various application scenarios are accelerating the integration. The multicast broadcast service (MBS) scenario is a traditional service scenario that exists to meet the needs of most users for the same service. Currently, the 5G-related technologies that have been discussed and standardized in the industry are mainly about unicast business scenarios, that is, a PTP (Point to Point) service model. The discussion on the standardization of a PTM (Point to multipoint) service model has not yet begun. In addition, with the rapid growth of the number of users and the multidimensional application scenarios, the point-to-multipoint business model will inevitably become one of the indispensable service models.

For future growth of wireless communication and, in particular multicast broadcast services, it will be beneficial to resolve how to reasonably and effectively realize a multicast broadcast service under the technical framework of 5G-NR (New Radio, New Radio). Currently, 5G base stations support CU/DU separation and CU CP/UP separation, among which CU-CP and CU-UP communicate through the E1 interface. In such a case, how to carry out broadcast/multicast service bearer establishment through the E1 interface, especially the configuration information exchanged by the E1 interface, is not known.

The techniques disclosed in the present document allow embodiments to support schemes for introducing broadcast/multicast services into the NR. The disclosed embodiments can be used for network-side establishment of broadcast/multicast service support. In particular, the present document discloses flexible configuration information that may be exchanged between a control plane (CP) function and a user plane (UP) function at a network device. This information may be exchanged over a suitable interface such as the E1 interface.

The present document uses examples from the 3GPP New Radio (NR) network architecture and 5G protocol only to facilitate understanding and the disclosed techniques and embodiments may be practiced in other wireless systems that use different communication protocols than the 3GPP protocols.

The following abbreviations are used in the present document.

Figure 1:
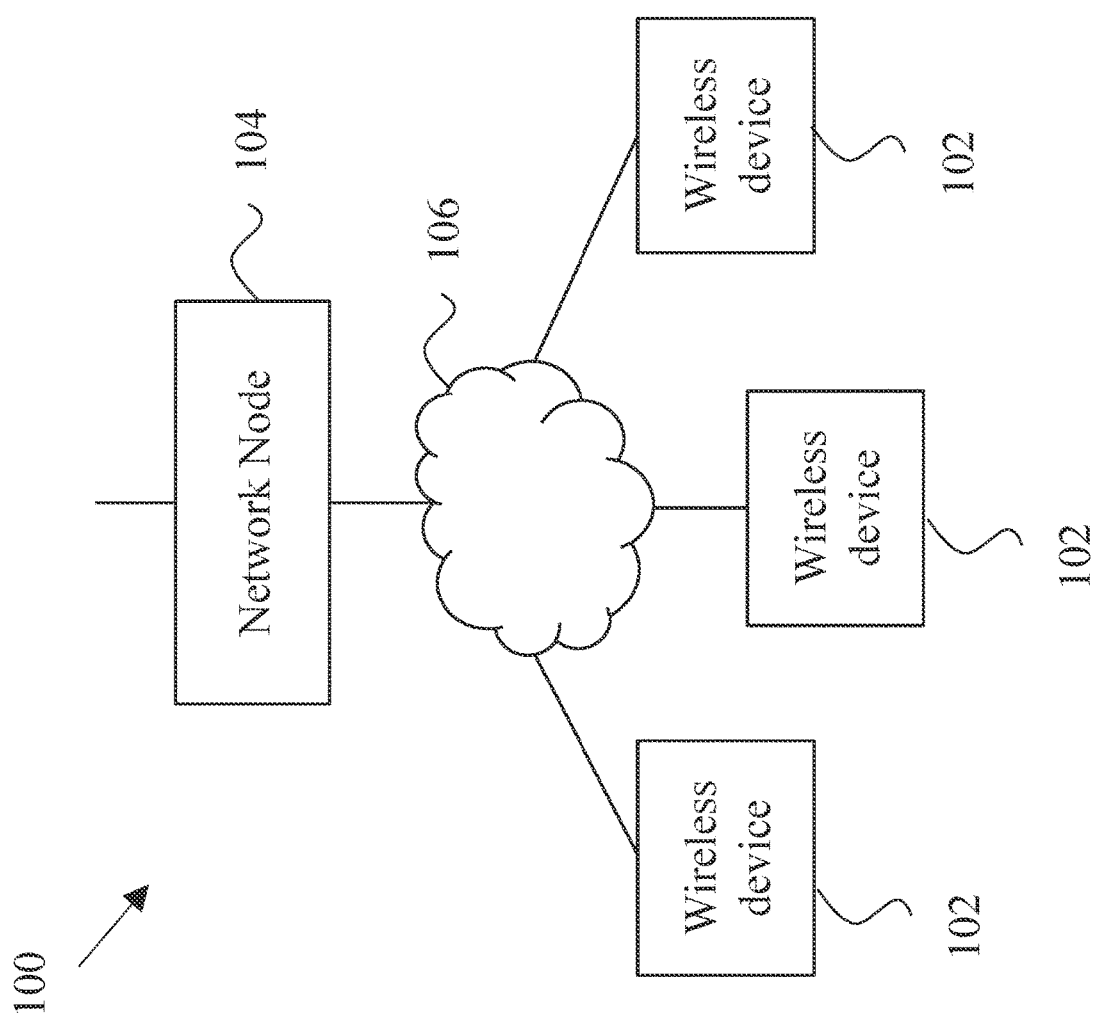
FIG. 1 shows an example of a wireless system that supports multicast and broadcast service (MBS).

AMBR—Aggregate Maximum Bit Rate
AMF—Access and Mobility Function
AP—Application Protocol
CP—Control Plane
CU—Central Unit
DU—Distributed Unit
GBR—Guaranteed Bit Rate
gNB—gNodeB
GTP—General Packet Radio Service Tunneling Protocol
ID—Identifier MBS—Multicast Broadcast Service
NG—Next Generation
NR—New Radio
PDCP—Packet Data Convergence Protocol
PDU—Protocol Data Unit
PTM—Point To Multipoint
PTP—Point To Point
QOS—Quality of Service
RAN—Radio Access Network
RLC—Radio Link Control
SDAP—Service Data Adaptation Protocol
SDU—Service Data Unit
TEID—Tunnel Endpoint Identifier
TMGI—Temporary Mobility Group Identity
TNL—Transport Network Layer
UE—User Equipment
UP—User Plane FIG. 1 shows an example network 100 in which MBS services may be provided to one or more wireless devices 102. The wireless devices 102 may be, for example, mobile phones, tablets, or other UEs that are capable of wireless or cellular communication.

The wireless devices 102 may be coupled to a network node 104 through a radio access network RAN 106. The network node 104 may be, for example a base station or another network-side device that is operated in the network to provide data connectivity to the wireless devices 102.

Figure 2:
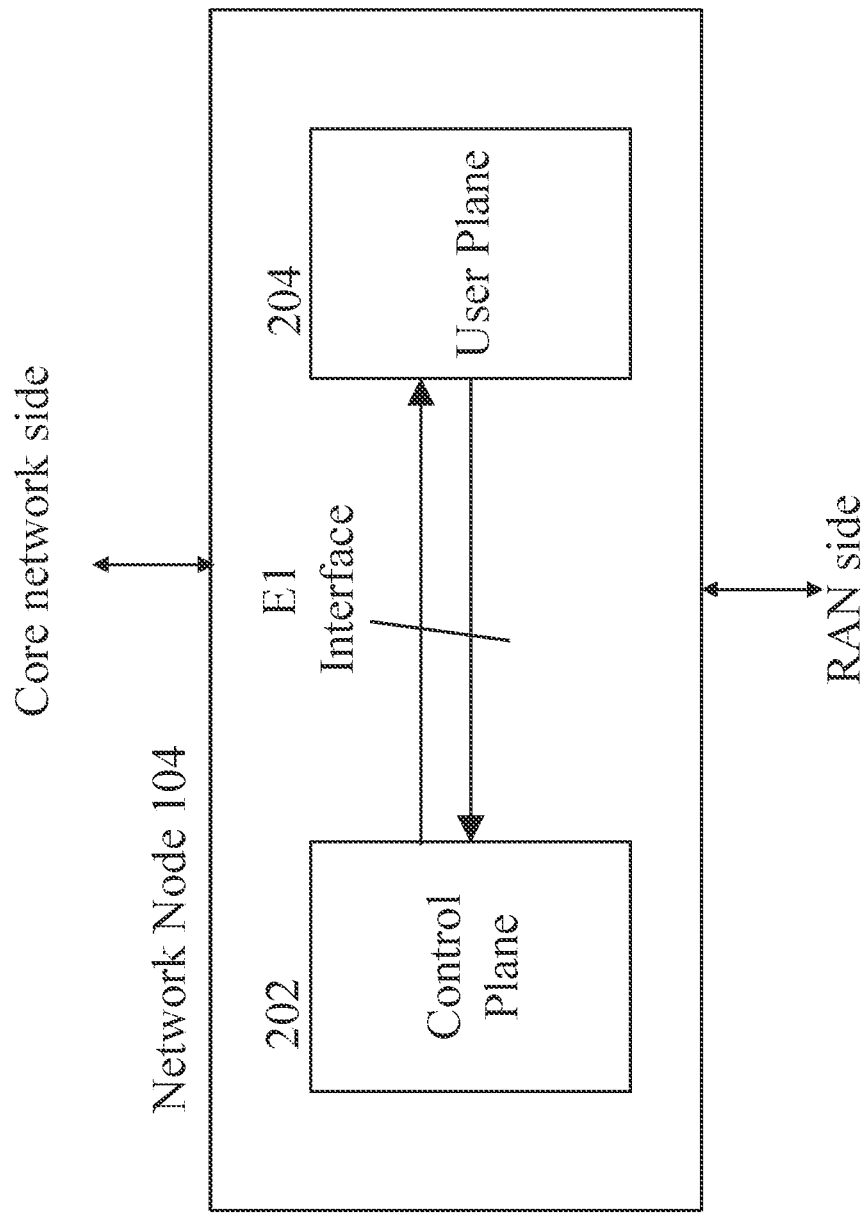
FIG. 2 shows an example implementation of a network node that provides MBS services to wireless devices.

FIG. 2 is an example of the network node 104 showing the Control Plane CP 202 and the User Plane UP 204 that are configured to implement control plane functions (e.g., related to device and connection control) and user plane functions (e.g., related to user data or application layer data traffic). The two functions 202, 204 may be configured to communicate with each other using an interface such as the E1 interface.

The network node 104 may be configured to implement various scenarios related to use of MBS services in the RAN 106 by wireless devices 102. For example, the network node may be a Central Unit (CU) that provides connectivity between RAN served by individual distributed units (DUs), which are not explicitly show in FIG. 1, and the core network (not explicitly shown in FIG. 1). During operation, for example, the network node 104 may establish a bearer to carry data traffic for a service to one or more wireless devices 302, may add or remove a wireless device 302 from its subscription of an ongoing service, or change the mode by which the wireless device receives the service from unicast to multicast/broadcast and vice versa. Example embodiment 1

CU-CP requests CU-UP to setup an MBS bearer to support MBS traffic transfer. To be specific, CU-CP requests CU-UP to setup MBS bearer through an MBS bearer setup/modification procedure. CU-CP may send the following info to CU-UP:

MBS session ID,
MBS session type.

In some embodiments, CU-CP may send a group member list which includes the identities of all the UEs interested in the MBS service. The UE ID may be a RAN UE ID, or an E1AP UE ID.

In various embodiments, UE may support the PTP mode, or the PTM mode, or both. Corresponding, the network node may either deliver a single copy of MBS data packets over the radio to a set of UEs (PTM) or delivers separate copies of MBS data packets over radio to individual UEs (PTP).

In some embodiments, CU-CP may send TMGI.

In some embodiments, CU-CP may send an MBS service identity.

In some embodiments, CU-CP may send the MBS session AMBR. This information may be sent for non-GBR QoS flows.

In some embodiments, CU-CP may send TNL information including IP Multicast Address and/or DL TEID to the CU-UP.

In some embodiments, CU-CP may send alternative TNL Information including IP Multicast Address and/or DL TEID to the CU-UP.

In some embodiments, CU-CP may send the following MBS bearer associated information to CU-UP:

(1) MBS bearer index that is used by CU-UP to identify different MBS bearers.

(2) MBS bearer type, which is used to indicate that the supported mode is PTP or PTM, or both.

(3) QOS flow information including 5QI, Allocation and Retention Priority, GBR QoS Flow Information. For GBR QOS Flow Information, CU-CP may provide Alternative QoS Parameters Set List to CU-UP via E1 interface, which may include Alternative QoS Parameters Set Index, Guaranteed Flow Bit Rate Downlink, Packet Delay Budget, Packet Error Rate, etc.

In some embodiments, CU-CP may send a Service Area information. The information may include Service Area identity, or a cell list.

A UE operating in the PTM-mode may need to feed back its DL data receiving status to gNB. To achieve this, when establishing an MBS bearer, CU-UP can setup additional GTP tunnels for the MBS bearer by which UE can transmit DL delivery status, e.g. PDCP status report, to CU-UP. Besides, CU-UP can use the additional tunnel for DL data re-transmission. Each additional tunnel may correspond to an RLC entity. To be specific, the MBS bearer associated information may also include one or more of:

1. A number of additional tunnels to be setup.
2. Identity of additional tunnel, and optionally the identity of the UE associated with the additional tunnel.
3. UE ID list, in this list, CU-CP includes all identities of the UEs required feedback.
4. additional tunnel setup indication. After receiving the indication, CU-UP may setup additional GTP tunnels when establishing the MBS bearer.

The UE ID or a group member list associated to each MBS bearer.

In some embodiments, the CU-UP may feedback UL UP Transport Layer Information associated to each additional tunnel to CU-CP and identity of each additional tunnel, and optionally the UE ID associated with each additional tunnel.

Example Scenario 1—UE Joins an MBS Service

Suppose, a UE joins an MBS service. If CU-UP has established MBS bearers, CU-CP may send the following info to CU-UP via MBS bearer modification request message:

MBS session ID.
MBS session type
TMGI,
MBS service identity,
MBS session AMBR. This information may be used for non-GBR QoS flows,
TNL information including IP Multicast Address+DL TEID,
Alternative TNL Information including IP Multicast Address+DL TEID.

the UE ID of the new UE,
indication about whether the UE supports PTP, or PTM, or both,
MBS bearer setup information.

Since CU-UP received the session and bearer configuration corresponding to the MBS session ID, upon receiving the MBS session again, CU-UP can perform bearer setup according to the previously received session and bearer configuration. In this case, CU-CP does not need to send session and bearer configuration to CU-UP again, thereby saving signaling overhead.

Example Scenario 2—UE leaves an MBS Service

Suppose a UE leaves MBS services. In this case, CU-CP may perform MBS bearer release/modification procedure. The already established MBS bearer may be released. Besides, CU-CP may send one or more of the following information items to CU-UP:
  instruction to release the additional tunnels related to the UE.
  an updated group member list which removes the identity of the UE that is not interested in MBS services,
  a remove ID list which includes the identity of the UE not interested in MBS services.

Example Scenario 3—UE switches from PTP to PTM mode

Suppose a UE is switched from PTP to PTM, CU-CP may inform CU-UP of this event. In order to allow the UE to begin receiving the service on the bearer, CU-CP may send one or more of the following information items to the CU-UP:
  the UE ID
  the information that the UE supports PTM now,
  instruction to release all the MBS bearers which are only associated with the UE,
  an updated group member list associated to each MBS bearer used for PTM,
  a number of additional tunnels to be setup, these additional tunnels are only used by the UE that is performing the switch.

Example Scenario 4—UE switches from PTM to PTP mode

Suppose a UE is switched from PTM to PTP, the following solutions can be considered regarding information provided by the CU-CP to the CU-UP:
Solution 1:
  In this solution, CU-CP performs MBS bearer modification procedure. In this case, the CU-UP may release all the additional tunnels associated to the UE. CU-CP sends bearer context setup/modification request message to CU-UP in order to setup MBS bearers for the UE.
Solution 2:
  In this case, CU-CP uses MBS bearer modification procedure to realize mode switch for the UE. To be specific, CU-CP may send one or more of the following information items to CU-UP:
    the UE ID,
    the information that the UE supports PTP now,
    instructions to release the additional tunnels related to the UE.
    an updated group member list associated to each MBS bearer used for PTM.
    MBS bearer setup information.

Example Embodiment 2

In some cases, CU-CP may request CU-UP to set up an MBS bearer to support MBS traffic transfer. To be specific, CU-CP requests CU-UP to set up MBS bearer through a bearer context setup/modification procedure, which is a UE-associated message. CU-CP may send one or more of the following information items to CU-UP:
  MBS session ID,
  MBS session type,
  UE supports PTP, or PTM, or both.
  TMGI,
  MBS service identity,
  MBS session AMBR. This rate may be used for non-GBR QOS flows,
  TNL information including IP Multicast Address and/or DL TEID,
  Alternative TNL Information including IP Multicast Address and/or DL TEID.

In some embodiments, CU-CP may send the following MBS bearer associated information to CU-UP:
  QOS flow information including 5QI, Allocation and Retention Priority, GBR QOS Flow Information. For GBR QOS Flow Information, CU-CP may provide Alternative QoS Parameters Set List to CU-UP via E1 interface, which may include Alternative QoS Parameters Set Index, Guaranteed Flow Bit Rate Downlink, Packet Delay Budget, Packet Error Rate, etc.
  Optionally, Service Area information, the information may include Service Area identity, or a cell list of cells supported.

Example Scenario 5

Suppose a UE leaves MBS services. In this case, CU-CP may perform a BEARER CONTEXT RELEASE procedure.

Example Scenario 6

Suppose a UE is switched from PTP to PTM. In this case, CU-CP may perform BEARER CONTEXT RELEASE procedure.

Example Embodiment 3

Figure 3:
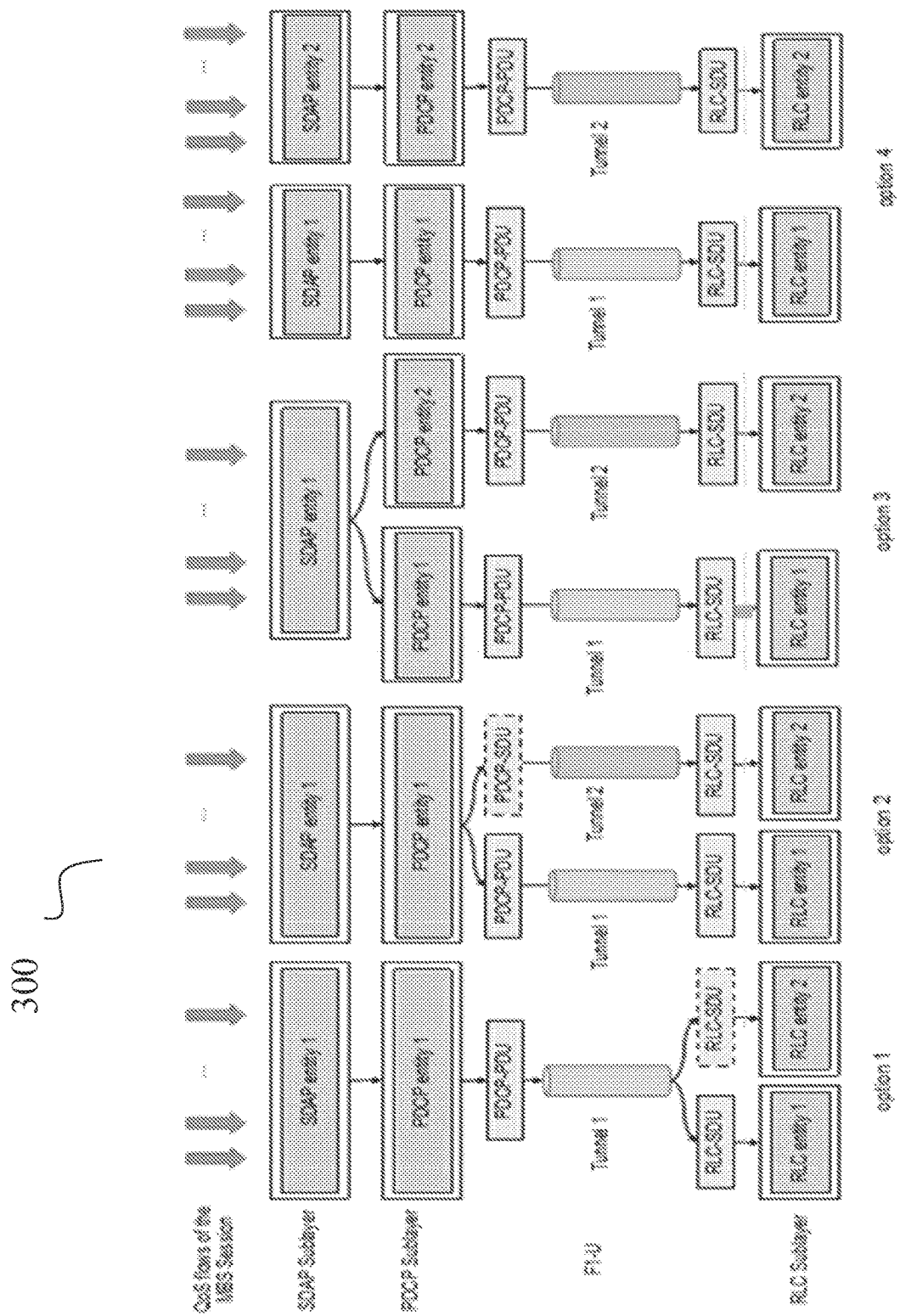
FIG. 3 shows an example of a protocol stack implementation for handling MBS services.

To enable that the data flows from the MBS Session can be delivered to the UEs in different delivery mode, i.e., PTP, PTM or both, for the same UE or different UEs, there are a few different options from the user plane (UP) perspective as shown in FIG. 3. The air interface protocol comprises the SDAP, PDCP, RLC, MAC and PHY layers. Different UP options utilize different protocol layer as the anchor layer for the mode switching, and in all the options different RLC entities are used for different delivery mode, either for the same UE or different UEs simultaneously.

In particular, Option 3, depicted in FIG. 3 may be as follows. Two different service deliveries may share the same SDAP entity, but different PDCP entities, GTP tunnels and RLC entities. In this option, the anchor layer is the SDAP layer. The QoS flows or data flows from the core network are submitted to the shared SDAP entity. The QoS flows are mapped to one set of MBS bearers, while the same QoS Flows are mapped to another set of MBS bearers with the same or different mapping rule. The MBS bearers are then processed by different PDCP entities with separate sequencing operation. Consequently, the PDCP PDUs from the above different PDCP entities are sent to different DUs in different GTP tunnels and delivered by different RLC entities.

In some embodiments that implement option 3, CU-CP may send an MBS bearer setup/modification request message to CU-UP. Furthermore, the message may include MBS bearer associated information.

In some embodiments, SDAP duplication indication and Duplication Activation indication.

In some embodiments, CU-CP includes, in the message, copy information for generating one or more copies of packets of the service:
  number of copies,
  information regarding whether the PTP mode and/or the PTM mode are supported by each of the one or more copies,
  UE ID or a group member list associated to each of the one or more copies.

The various embodiment examples described above may be used to provide the following technical solutions that are preferably implemented by some embodiments.

Figure 4:
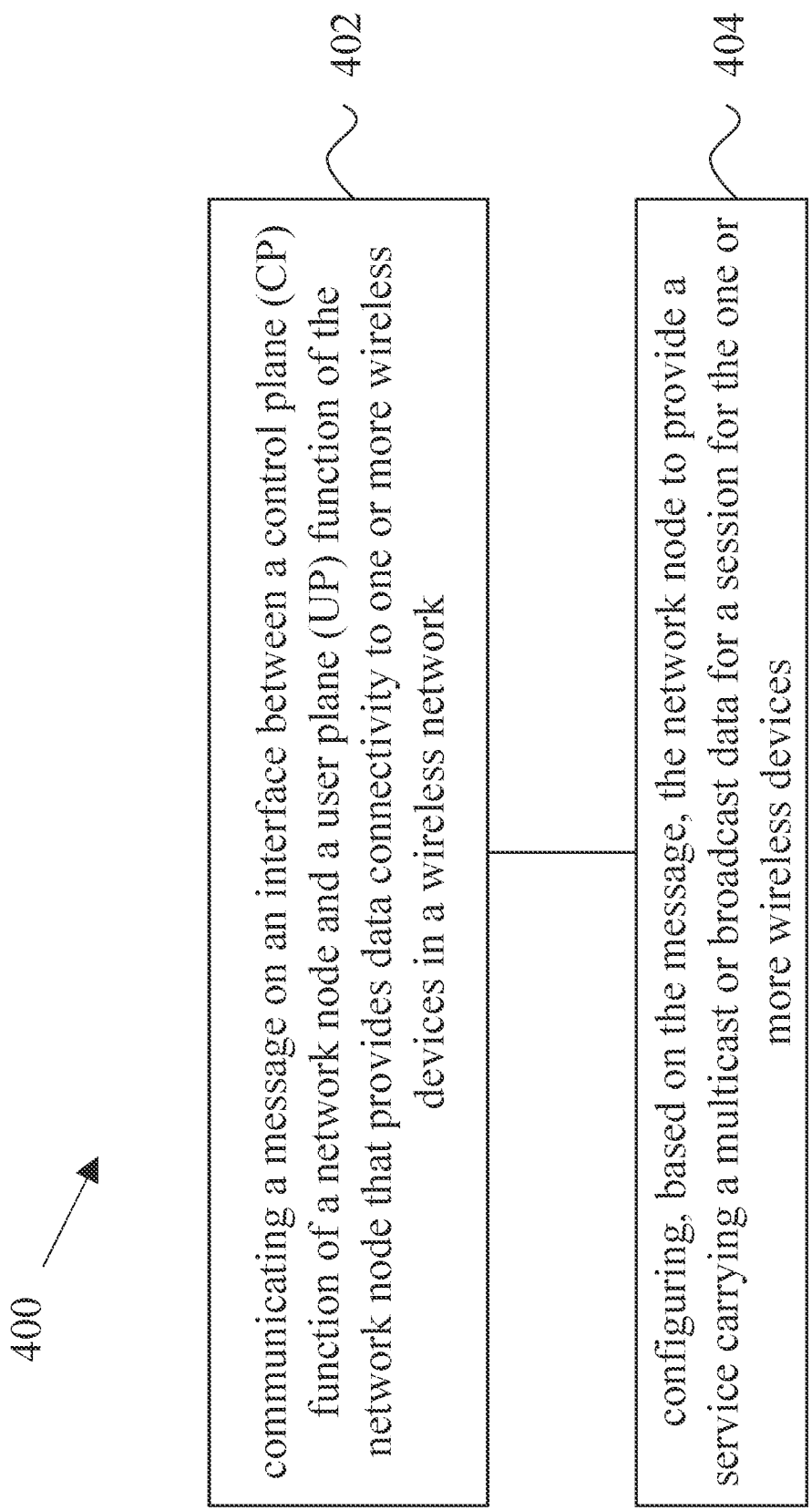
FIG. 4 shows an example of another method for wireless communication.

1. A method for wireless communication (e.g., method 400 depicted in FIG. 4), comprising: communicating (402) a message on an interface between a control plane (CP) function of a network node and a user plane (UP) function of the network node that provides data connectivity to one or more wireless devices in a wireless network; and configuring (404), based on the message, the network node to provide a service carrying a multicast or broadcast data for a session for the one or more wireless devices.

2. The method of solution 1, wherein the message comprises a request to set up a new bearer to carry the service, wherein the request is sent during a bearer setup procedure or a bearer modification procedure.

3. The method of solution 1, wherein the message comprises a request to set up a new bearer to carry the service, wherein the request is sent during a bearer context setup procedure or a bearer context modification procedure.

4. The method of solutions 2-3, wherein the message includes a session identifier for a session carrying the service.

5. The method of solutions 2-4, wherein the message includes a session type for the session.

6. The method of any of solutions 1-5, wherein the message includes one or more of: a group member list identifying all wireless devices that are interested in receiving the service, a temporary mobile group identifier (TMGI), an identifier of the service, an aggregate maximum bit rate associated with the session; one or more transport network layer (TNL) information including an internet protocol (IP) multicast address, and/or a downlink tunnel endpoint identifier (TEID).

7. The method of solution 6, wherein the group member list identifies the all wireless devices using either a radio access network identifier or an E1AP UE identifier.

8. The method of any of solutions 1-7, wherein the message includes an identifier for the bearer.

9. The method of any of solutions 1-7, wherein the message includes a quality of service (QOS) information associated with the bearer.

10. The method of any of solutions 1-9, wherein the message includes a service area information associated with the wireless device, including a cell list or identities of one or more service areas. For example, the service areas may represent all cells to which the wireless devices that are subscribed to the service are located.

11. The method of any of solutions 1-10, wherein the message further includes a field indicating associated information for the bearer. Various possible examples of the associated information are described in the present document.

12. The method of solution 11, wherein the associated information includes: a number of additional tunnels to be set up, identifiers of wireless devices associated with each tunnel, an identity of the UE associated with the one or more additional tunnels, or a list of wireless devices that are group members of each group associated with each bearer set up by the UP function.

13. The method of solution 12, wherein the additional tunnels are used for transmitting downlink data delivery status for each wireless device that uses the PTM mode.

14. The method of any of solutions 1-13, including: receiving, by the CP function from the UP function, uplink transport layer information associated with the additional tunnels, an identifier for the additional tunnels, UE IDs associated with each tunnel.

15. The method of solutions 1 or 3, wherein, the message is sent in case that a wireless device exits the service, wherein the message includes one or more of: instructions to release the existing bearers, instructions to release additional tunnels established for the wireless device, an updated list of group members, or a remove identifier list including an identifier of the wireless device.

16. The method of any of solutions 1-15, including: communicating, from the CP function to the UP function, indication of packet duplication at a service data adaptation protocol (SDAP) layer and/or an indication of activation of a duplication function.

17. The method of any of solutions 1 to 16, including: communicating, from the CP function to the UP function, copy information for generating one or more copies of packets of the service.

18. The method of solution 17, wherein the copy information includes a number of copies.

19. The method of any of solutions 17-18, wherein the copy information includes information regarding whether the PTP mode and/or the PTM mode are supported by each of the one or more copies.

20. The method of any of solutions 17-19, wherein the copy information includes UE ID or a group member list associated to each of the one or more copies.

21. The method of solution 11, wherein the associated information includes Quality of Service (QOS) information associated with the bearer including guaranteed bitrate (GBR) flow information comprising one or more of: an alternative QoS parameters set list including an alternative QoS parameters set index, a guaranteed flow bit rate in downlink direction, a packet delay budget, or a packet error rate.

22. The method of solution 11, wherein the associated information includes one or more of: a UE ID list identifying the UEs that require feedback.

23. The method of solution 11, 12 or 22, wherein the associated information includes one or more of: an additional tunnel setup indication for UP function to set up additional GTP tunnels when establishing the bearer.

24. A wireless communications apparatus comprising a processor and a memory, wherein the processor is configured to read code from the memory and implement a method recited in any of solutions 1 to 23.

25. A computer program product comprising a computer-readable program medium code stored thereupon, the code, when executed by a processor, causing the processor to implement a method recited in any of solutions 1 to 23.

In the above-described solutions, the multicast or broadcast data or the service may be, for example, the MBS streams and services described in 3GPP document 3GPP TS 22.246, 23.246 or 26.946. For example, using MBS streams, a wireless device will be able to receive a same content using either unicast, or multicast or broadcast transmission, according to the network conditions.

Figure 5:
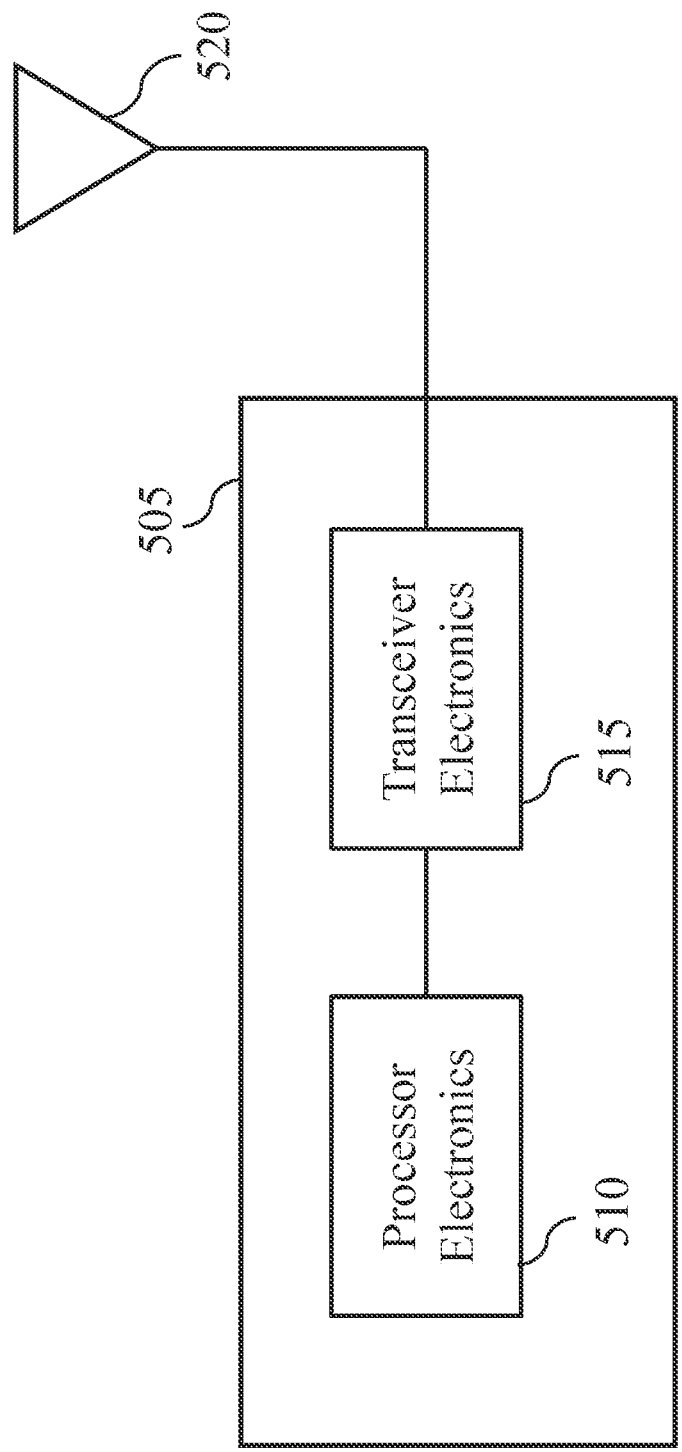
FIG. 5 is a block diagram representation of a portion of an apparatus that can be used to implement methods and techniques of the presently disclosed technology.

FIG. 5 is a block diagram representation of a portion of an apparatus, in accordance with some embodiments of the presently disclosed technology. An apparatus 505, such as a base station or a network node or a wireless device (or UE), can include processor electronics 510 such as a microprocessor that implements one or more of the techniques presented in this document. The apparatus 505 can include transceiver electronics 515 to send and/or receive wireless signals over one or more communication interfaces such as antenna(s) 520. The apparatus 505 can include other communication interfaces for transmitting and receiving data. For example, a network node may include a wired connection on the core network side. Apparatus 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the apparatus 505. In some embodiments, the apparatus 505 may be used to implement the CP or UP functions described herein.

It will be appreciated that several examples of messages communicated between a control plane and a user plan of a network device in order to facilitate establishment, ongoing maintenance and cancellation of an MBS service to a wireless device or assignment of a bearer to an MBS service are disclosed. In one example aspect, the disclosed techniques can be used to reduce the amount of control signaling that is performed on the E1 interface in a central unit. In another example aspect, the disclosed techniques can be used to provide seamless changes to MBS delivery, including, allowing UEs to join a new multicast broadcast service or change a mode by which an existing multicast broadcast service is being received by the UE.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for a network node to perform wireless communication, comprising:
  sending, by a control plane (CP) function of the network node to a user plane (UP) function of the network node, one or more messages on an interface between the CP function and the UP function, wherein the network node provides data connectivity to one or more wireless devices in a wireless network,
  wherein the one or more messages comprise a request to set up a new bearer to carry a service, wherein the request is sent during a bearer context setup procedure or a bearer context modification procedure;
  wherein the request includes a session identifier for a session carrying the service;
  wherein, the request is sent in case that a wireless device exits the service, wherein the request includes one or more of: instructions to release an already established bearer, instructions to release additional tunnels established for the wireless device, an updated list of group members, or a remove identifier list including an identifier of the wireless device;

wherein a message of the one or more messages includes one or more of: a group member list identifying all wireless devices that are interested in receiving the service, a temporary mobile group identifier (TMGI), an identifier of the service, an aggregate maximum bit rate associated with the session, and one or more transport network layer (TNL) information including an internet protocol (IP) multicast address, or a downlink tunnel endpoint identifier (TEID); and configuring, by the UP function of the network node, based on the request, the network node to provide the service carrying a multicast or broadcast data for the session for the one or more wireless devices.

2. The method of claim 1, wherein the request includes a session type for the session.

3. The method of claim 1, wherein the group member list identifies the all wireless devices using either a radio access network UE identifier or an E1AP UE identifier.

4. The method of claim 1, wherein the request includes an identifier for the new bearer.

5. The method of claim 1, wherein the request includes a quality of service (Qos) information associated with the new bearer.

6. The method of claim 1, wherein a message of the one or more messages includes a service area information associated with the wireless device, including a cell list or identities of one or more service areas.

7. The method of claim 1, wherein the request further includes a field indicating associated information for the new bearer.

8. The method of claim 7, wherein the associated information includes: one or more additional tunnels to be set up, an identity of a UE associated with the one or more additional tunnels, or a list of wireless devices that are group members of each group associated with each bearer set up by the UP function.

9. The method of claim 8, including:
receiving, by the CP function from the UP function, uplink transport layer information associated with the one or more additional tunnels, an identifier for the one or more additional tunnels, UE IDs associated with each tunnel.

10. The method of claim 1, including:
communicating, from the CP function to the UP function, an indication of packet duplication at a service data adaptation protocol (SDAP) layer or an indication of activation of a duplication function.

11. The method of claim 7, wherein the associated information includes Quality of Service (QOS) information associated with the new bearer including guaranteed bitrate (GBR) flow information comprising one or more of: an alternative Qos parameters set list including an alternative Qos parameters set index, a guaranteed flow bit rate in downlink direction, a packet delay budget, a packet error rate, a UE ID list identifying UEs that require feedback, or an additional tunnel setup indication for UP function to set up additional GTP tunnels when establishing the new bearer.

12. A wireless communication apparatus comprising at least one processor and a memory, wherein the at least one processor is configured to read code from the memory and cause a network node to implement a method comprising:
sending, by a control plane (CP) function of the network node to a user plane (UP) function of the network node, one or more messages on an interface between the CP function and the UP function, wherein the network node provides data connectivity to one or more wireless devices in a wireless network, wherein the one or more messages comprise a request to set up a new bearer to carry a service, wherein the request is sent during a bearer context setup procedure or a bearer context modification procedure;

wherein the request includes a session identifier for a session carrying the service;

wherein, the request is sent in case that a wireless device exits the service, wherein the request includes one or more of: instructions to release an already established bearer, instructions to release additional tunnels established for the wireless device, an updated list of group members, or a remove identifier list including an identifier of the wireless device;

wherein a message of the one or more messages includes one or more of: a group member list identifying all wireless devices that are interested in receiving the service, a temporary mobile group identifier (TMGI), an identifier of the service, an aggregate maximum bit rate associated with the session, and one or more transport network layer (TNL) information including an internet protocol (IP) multicast address, or a downlink tunnel endpoint identifier (TEID); and configuring, by the UP function of the network node, based on the request, the network node to provide the service carrying a multicast or broadcast data for the session for the one or more wireless devices.

13. The wireless communication apparatus of claim 12, wherein the request includes a session type for the session.

14. The wireless communication apparatus of claim 12, wherein the group member list identifies the all wireless devices using either a radio access network UE identifier or an E1AP UE identifier.

15. The wireless communication apparatus of claim 12, wherein the request includes:
an identifier for the new bearer, or
a quality of service (QOS) information associated with the new bearer, or
a field indicating associated information for the new bearer.

16. The wireless communication apparatus of claim 15, wherein the associated information includes: one or more additional tunnels to be set up, an identity of a UE associated with the one or more additional tunnels, or a list of wireless devices that are group members of each group associated with each bearer set up by the UP function.

17. The wireless communication apparatus of claim 15, wherein the associated information includes Quality of Service (QOS) information associated with the new bearer including guaranteed bitrate (GBR) flow information comprising one or more of: an alternative Qos parameters set list including an alternative Qos parameters set index, a guaranteed flow bit rate in downlink direction, a packet delay budget, a packet error rate, a UE ID list identifying UEs that require feedback, or an additional tunnel setup indication for UP function to set up additional GTP tunnels when establishing the new bearer.

* * * * *